(12) United States Patent
Nishikawa et al.

(10) Patent No.: US 11,447,424 B2
(45) Date of Patent: Sep. 20, 2022

(54) MANUFACTURING METHOD FOR CERAMIC MATRIX COMPOSITE

(71) Applicant: MITSUBISHI HEAVY INDUSTRIES AERO ENGINES, LTD., Aichi (JP)

(72) Inventors: Kosuke Nishikawa, Tokyo (JP); Akira Fukushima, Aichi (JP); Ryoma Nogami, Aichi (JP); Azusa Tamugi, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 234 days.

(21) Appl. No.: 16/313,108

(22) PCT Filed: Dec. 6, 2017

(86) PCT No.: PCT/JP2017/043885
§ 371 (c)(1),
(2) Date: Dec. 24, 2018

(87) PCT Pub. No.: WO2018/105670
PCT Pub. Date: Jun. 14, 2018

(65) Prior Publication Data
US 2019/0225551 A1     Jul. 25, 2019

(30) Foreign Application Priority Data

Dec. 7, 2016 (JP) .............................. JP2016-237869

(51) Int. Cl.
C04B 35/80 (2006.01)
C04B 35/18 (2006.01)
(Continued)

(52) U.S. Cl.
CPC ............ *C04B 35/80* (2013.01); *C04B 35/111* (2013.01); *C04B 35/18* (2013.01); *D06M 15/41* (2013.01);
(Continued)

(58) Field of Classification Search
CPC ....... C04B 35/111; C04B 35/18; C04B 35/80; C04B 35/803; C04B 2237/086;
(Continued)

(56) References Cited

U.S. PATENT DOCUMENTS

| | | | | |
|---|---|---|---|---|
| 4,888,311 | A | * | 12/1989 | Davidovits ......... C04B 41/5076 501/95.2 |
| 6,020,063 | A | * | 2/2000 | Riffle .......................... C08J 5/06 428/105 |

(Continued)

FOREIGN PATENT DOCUMENTS

JP          5129997 B2      1/2013

OTHER PUBLICATIONS

Levi, Carlos, "Processing and Performance of an All-Oxide Ceramic Composite" 1998, Journal of the American Ceramic Society (Year: 1998).*

*Primary Examiner* — Michael M. Robinson
*Assistant Examiner* — Victoria Bartlett
(74) *Attorney, Agent, or Firm* — Hauptman Ham, LLP

(57) ABSTRACT

A manufacturing method for a ceramic matrix composite, having a woven fabric that has multiple fiber bundles and having a matrix that is disposed in the gaps between the fiber bundles, includes: a green body formation step for forming a green body by sintering the woven fabric infiltrated with a polymer that is a precursor to the matrix; and a densification step for further infiltrating the green body with a polymer and sintering same. The densification step includes: a second infiltration step for further infiltrating the green body with a polymer so as to form an infiltrated green body; a drying step for drying the infiltrated green body so as to form a dried green body; a steam treatment step for leaving the dried green body under saturation water vapor pressure (Continued)

so as to form a treated green body; and a sintering step for sintering the treated green body.

4 Claims, 7 Drawing Sheets

(51) Int. Cl.
    *D06M 15/55*     (2006.01)
    *D06M 15/59*     (2006.01)
    *D06M 15/41*     (2006.01)
    *D06M 15/564*     (2006.01)
    *C04B 35/111*     (2006.01)

(52) U.S. Cl.
    CPC .......... *D06M 15/55* (2013.01); *D06M 15/564* (2013.01); *D06M 15/59* (2013.01); *C04B 2235/5256* (2013.01); *C04B 2235/606* (2013.01); *C04B 2235/6588* (2013.01); *C04B 2237/086* (2013.01)

(58) Field of Classification Search
    CPC .... C04B 2235/5224; C04B 2235/5228; C04B 2235/5244; C04B 2235/5256; C04B 2355/606; C04B 2235/616; C04B 2235/6588; D06M 15/41; D06M 15/55; D06M 15/564; D06M 15/59
    See application file for complete search history.

(56) References Cited

U.S. PATENT DOCUMENTS

| | | | |
|---|---|---|---|
| 7,897,170 B2* | 3/2011 | Strickler | A61L 27/16 424/443 |
| 2010/0081556 A1 | 4/2010 | Heng et al. | |
| 2012/0123053 A1* | 5/2012 | Kibayashi | B29B 15/08 524/606 |
| 2014/0093659 A1* | 4/2014 | Riman | C04B 35/64 427/595 |

* cited by examiner

PROCESS OF SYNTHESIS AND PYROLYSIS OF POLYURETHANE

MANUFACTURING METHOD FOR CERAMIC MATRIX COMPOSITE

RELATED APPLICATIONS

The present application is a National Phase of International Application Number PCT/JP2017/043885 filed Dec. 6, 2017 and claims priority to Japanese Application Number 2016-237869 dated Dec. 7, 2016.

TECHNICAL FIELD

The present invention relates to a manufacturing method for a ceramic matrix composite.

BACKGROUND ART

It is studied to use a composite material for a fuselage or engine of an aircraft, and a high-temperature part or a part requiring light weight and high durability in an industrial gas turbine engine. As an example of such a composite material, for example, a ceramic matrix composite (CMC: Ceramic Matrix Composites) described in PTL 1 is known.

The ceramic matrix composite has a woven fabric that has a plurality of fiber bundles and a reinforcing material called a matrix which fills a gap between the fiber bundles. In obtaining the ceramic matrix composite, a technique called a PIP method (Polymer Infiltration and Pyrolysis method) is used as an example. The PIP method includes a step of infiltrating a woven fabric with a polymer in a solution which contains the polymer that becomes a precursor of the matrix, and a step of drying and sintering the infiltrated polymer.

CITATION LIST

Patent Literature

[PTL 1] Japanese Patent No. 5129997

SUMMARY OF INVENTION

Technical Problem

However, in order to obtain a ceramic matrix composite having desired strength characteristics by the PIP method, it is necessary to repeat each of steps of infiltrating, drying, and sintering the polymer a plurality of times. For this reason, it has been a problem that manufacturing time is prolonged. Furthermore, it is also known that in a case where the sintering step is repeated a plurality of times, decreased strength occurs due to deterioration of fiber bundles.

The present invention has been made to solve the above-described problems, and an object of the present invention is to provide a manufacturing method for a ceramic matrix composite which is unlikely to result in decreased strength and with which it is possible to shorten manufacturing time.

Solution to Problem

According to the present invention, there is provided a manufacturing method for a ceramic matrix composite having a woven fabric that has a plurality of fiber bundles and a matrix that is disposed in a gap between the fiber bundles, the method including a green body formation step of forming a green body by infiltrating the woven fabric with a polymer as a precursor of the matrix and performing sintering, and a densification step of further infiltrating the green body with the polymer and performing sintering, in which the densification step includes a second infiltration step of further infiltrating the green body with the polymer to form an infiltrated green body, a drying step of drying the infiltrated green body to form a dried green body, a steam treatment step of leaving the dried green body under a saturation water vapor pressure to form a treated green body, and a sintering step of sintering the treated green body.

According to this method, by carrying out the steam treatment step, it is possible to increase infiltration efficiency of the polymer with respect to the green body. That is, it is possible to obtain a ceramic matrix composite having desired characteristics without carrying out a subsequent sintering step many times. Furthermore, it is possible to avoid decreased strength due to heat which occurs in a case where the sintering step is repeated.

In addition, in the manufacturing method for a ceramic matrix composite, after the steam treatment step, the second infiltration step, the drying step, and the steam treatment step may be repeated, and in the sintering step, the treated green body for which the second infiltration step, the drying step, and the steam treatment step have been repeated a plurality of times may be calcined.

According to this method, the infiltration efficiency of the polymer with respect to the green body can be further increased.

In addition, in the manufacturing method for a ceramic matrix composite, the steam treatment step may be carried out under saturation water vapor at 30° C. to 200° C.

According to this method, since the treatment can be carried out at a relatively low temperature, the infiltration efficiency of the polymer with respect to the green body can be increased without using a large-scale facility.

In addition, in the manufacturing method for a ceramic matrix composite, the woven fabric may have a sizing agent that covers a periphery of the fiber bundle, and the method may further include an interface coating formation step of forming an interface coating on the fiber bundle by heating the woven fabric under a nitrogen atmosphere to modify the sizing agent, before the green body formation step.

According to this method, it is possible to form the interface coating by using the sizing agent which has adhered, from the beginning, on peripheries of the fiber bundle and fibers that form the fiber bundle. That is, it is possible to form the interface coating on peripheries of the fiber bundle and the fibers without carrying out a desizing step which is carried out in the related art. As a result, it is possible to decrease man-hours.

In addition, in the manufacturing method for a ceramic matrix composite, the sizing agent may be at least one selected from the group consisting of polyurethane, epoxy resin, polybutadiene, polyalkylene glycol, polyolefin resin, vinyl ester resin, saturated polyester resin, unsaturated polyester resin, polyamide resin, polyimide resin, polyamideimide resin, acrylic resin, polypropylene resin, and pitch-based resin.

According to this method, as the sizing agent, at least one selected from the group consisting of polyurethane, epoxy resin, polybutadiene, polyalkylene glycol, polyolefin resin, vinyl ester resin, saturated polyester resin, unsaturated polyester resin, polyamide resin, polyimide resin, polyamideimide resin, acrylic resin, polypropylene resin, and pitch-based resin is used. These chemical species are changed to have a carbon-based molecular structure by being heated under a nitrogen atmosphere. Therefore, according to this method, it is possible to form the interface coating in an easy and inexpensive manner.

In addition, the manufacturing method for a ceramic matrix composite is a manufacturing method for a ceramic matrix composite having a woven fabric that a plurality of fiber bundles and a sizing agent covering a periphery of the fiber bundle, and having a matrix that is disposed in a gap between the fiber bundles, the method including an interface coating formation step of forming an interface coating on the fiber bundle by heating the woven fabric under a nitrogen atmosphere to modify the sizing agent, a green body formation step of forming a green body by infiltrating the woven fabric, on which the interface coating has been formed, with a polymer as a precursor of the matrix, and a densification step of further infiltrating the green body with the polymer and performing sintering.

According to this method, due to the interface coating formation step, it is possible to form the interface coating by using the sizing agent which has adhered, from the beginning, on peripheries of the fiber bundle and fibers that form the fiber bundle. That is, it is possible to form the interface coating on peripheries of the fiber bundle and the fibers without carrying out a desizing step which is carried out in the related art. As a result, it is possible to decrease manhours and to obtain a ceramic matrix composite having higher strength.

Advantageous Effects of Invention

According to the present invention, it is possible to provide a manufacturing method for a ceramic matrix composite which is unlikely to result in decreased strength and with which it is possible to shorten manufacturing time.

DESCRIPTION OF EMBODIMENTS

First Embodiment

Hereinafter, embodiments of the present invention will be described with reference to the drawings, but the present invention is not limited thereto. Constituent elements of each embodiment described below can be appropriately combined. In addition, some constituent elements may not be used. In addition, constituent elements in the following embodiments include constituent elements that can be easily replaced by those skilled in the art, or the substantially same constituent elements.

Figure 1:
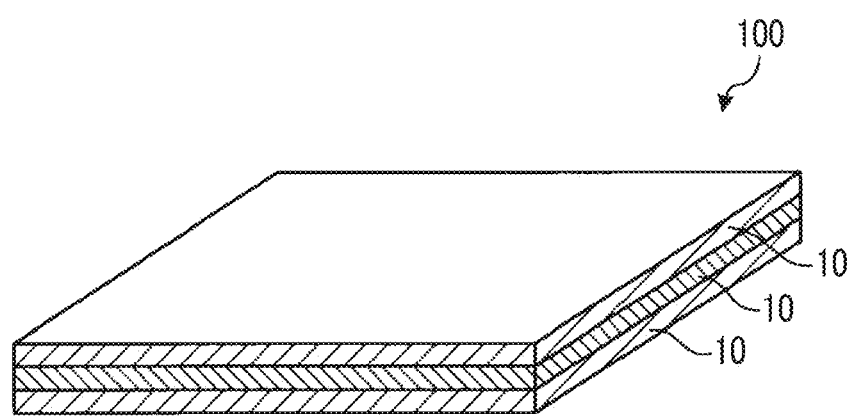
FIG. 1 is a schematic diagram showing a configuration of a ceramic matrix composite according to a first embodiment of the present invention.

As shown in FIG. 1, a ceramic matrix composite 100 is formed in a thin plate shape as an example by laying-up a plurality of fiber layers 10. In other words, the ceramic matrix composite 100 has a plurality of fiber layers 10 disposed in an overlapped manner. In the example shown in FIG. 1, a boundary line is indicated between the plurality of fiber layers 10 for convenience. However, in an actual ceramic matrix composite 100, there is no such a clear boundary line between the fiber layers 10, and the plurality of fiber layers 10 are united with one another. In addition, a shape of the ceramic matrix composite 100 is not limited to the plate shape shown in FIG. 1, and the ceramic matrix composite 100 can have various shapes. In the following description, the ceramic matrix composite 100 may be abbreviated as CMC.

Figure 2:
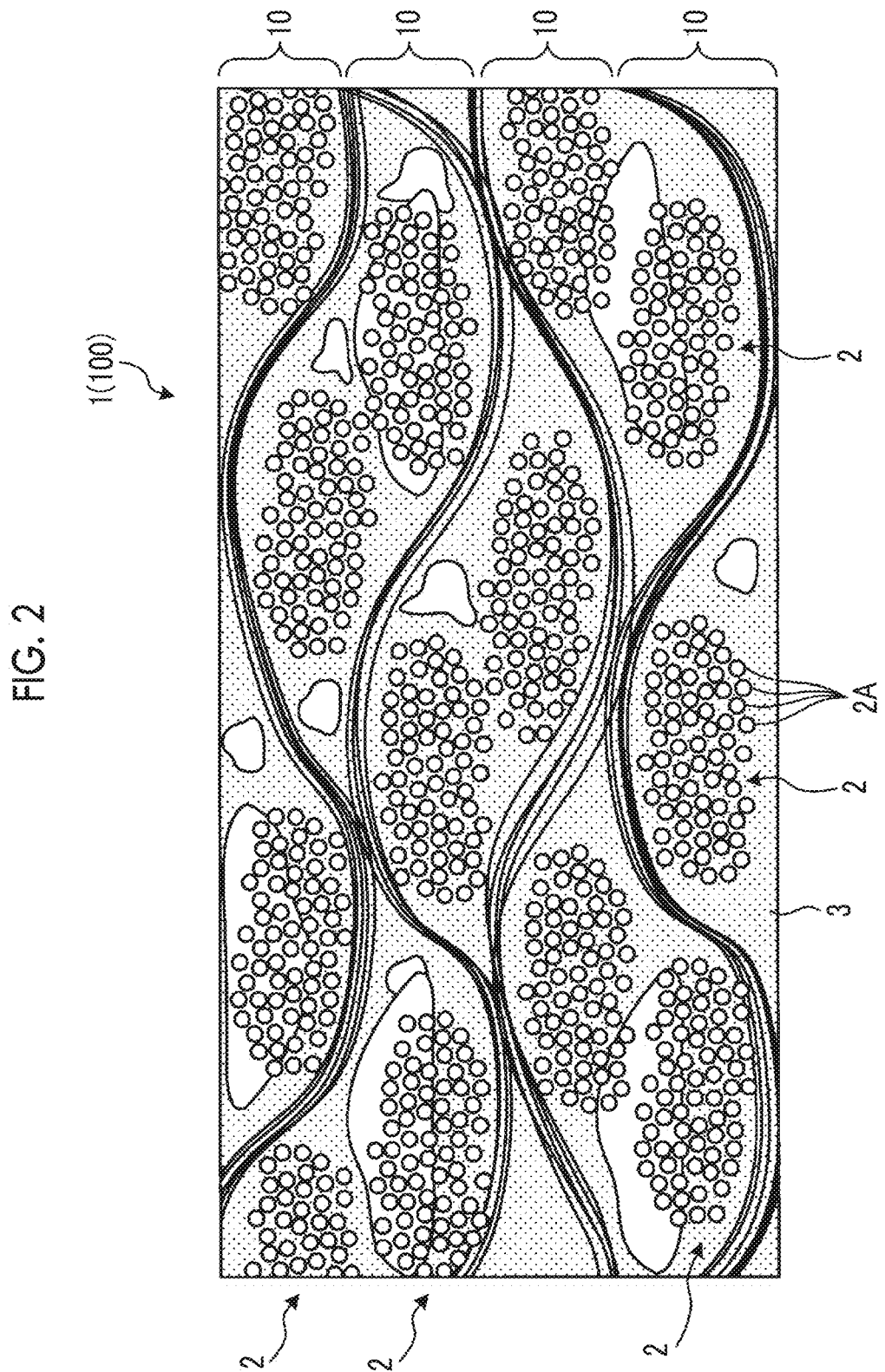
FIG. 2 is an enlarged schematic view showing a configuration of the ceramic matrix composite according to the first embodiment of the present invention.

As shown in FIG. 2, the fiber layer 10 includes a woven fabric 1 and a matrix 3. In addition, FIG. 2 schematically shows a configuration of the fiber layer 10. The woven fabric 1 is a fabric formed by weaving a plurality of fiber bundles 2. The fiber bundle 2 according to the present embodiment is a bundle of several hundred to several thousands of fibers 2A that are composed mainly of oxides such as alumina and mullite. As the fiber bundle 2, it is also possible to use SiC-based fibers. The woven fabric 1 can be formed by applying plain weave or satin weave to such a fiber bundle 2. Furthermore, the woven fabric 1 can also be formed as a non-woven fabric using the fiber bundle 2.

The matrix 3 is disposed in a gap formed between a plurality of fiber bundles 2 or in a gap formed between fibers 2A. The matrix 3 reinforces the fiber bundle 2 by infiltrating the fiber bundle 2. Specifically, like the fiber bundle 2, the matrix 3 is composed mainly of oxides such as alumina and mullite.

Figure 3:
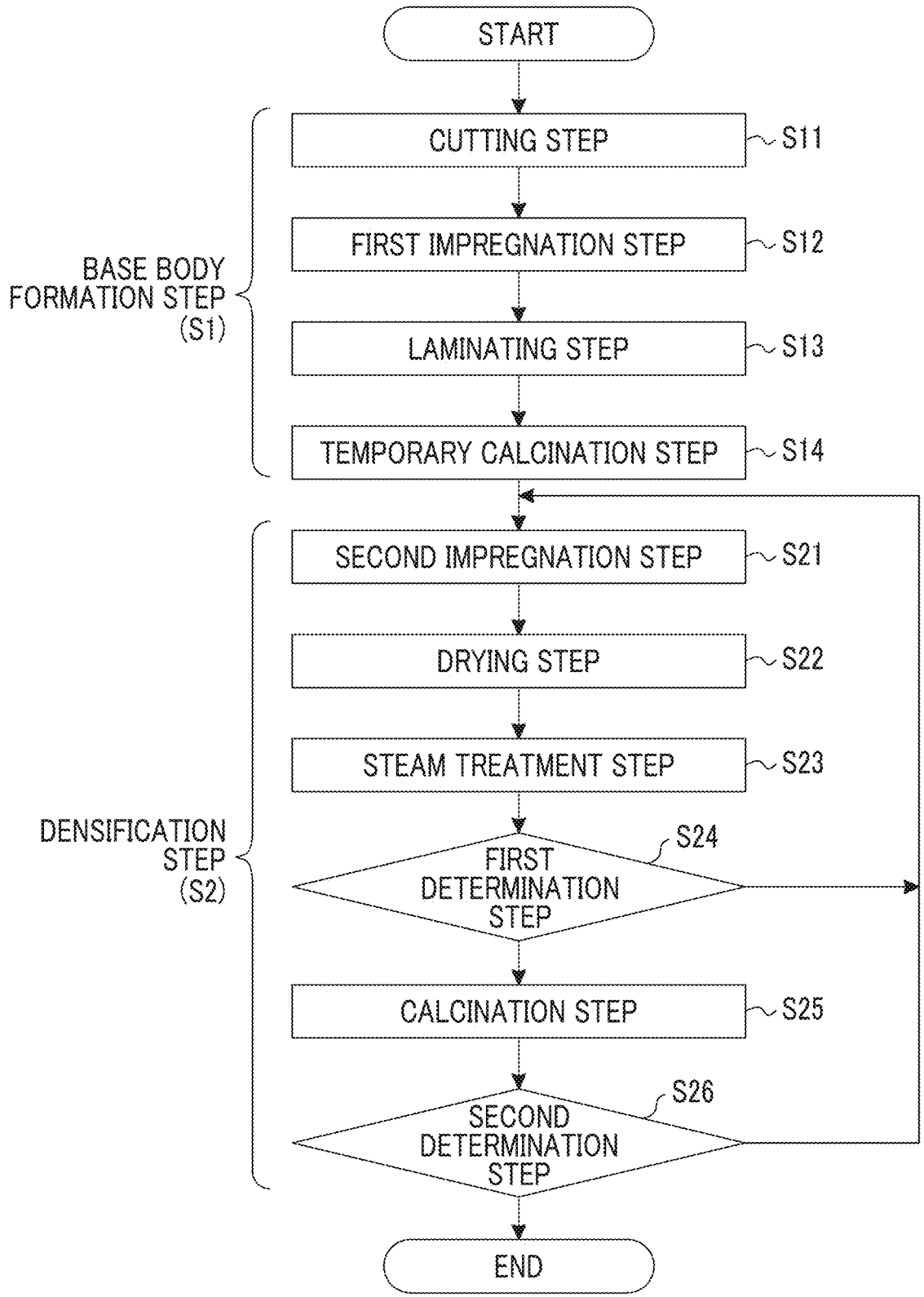
FIG. 3 is a process chart showing a manufacturing method for the ceramic matrix composite according to the first embodiment of the present invention.

Next, with reference to FIG. 3, a manufacturing method for the ceramic matrix composite 100 will be described. The manufacturing method for the ceramic matrix composite 100 according to the present embodiment includes a green body formation step S1 and a densification step S2. In the green body formation step S1, the woven fabric 1 is infiltrated with a polymer as a precursor of the matrix 3. In the densification step S2, a density of the matrix 3 is increased by further infiltrating the woven fabric 1 with the polymer.

The green body formation step S1 includes a cutting step S11, a first infiltration step S12, a lay-up step S13, and a temporary sintering step S14. In addition, in the green body formation step S1, the first infiltration step S12 and the lay-up step S13 may be repeated a plurality of times. In the cutting step S11, the woven fabric 1 is cut into a predetermined desired shape and dimension. In the first infiltration step S12, the cut woven fabric 1 is infiltrated with the polymer as a precursor of the matrix 3. The polymer as the precursor is pyrolyzed into the matrix 3 in the temporary sintering step S14 to be described later. In the first infiltration step S12, the woven fabric 1 is immersed in a slurry containing powders of the polymer, so that a part of the woven fabric 1 is infiltrated with the polymer.

In the lay-up step S13, a plurality of green bodies are layed-up until a desired thickness is obtained. In a case of laying-up of the green bodies, pseudo-isotropy can also be imparted to the layed-up green bodies by changing an orientation of the fibers for each layer. Specifically, in a case of laying-up n layers of green bodies, pseudo-isotropy can be realized by changing the orientation of the fibers at each layer by $(360/n)°$. In the temporary sintering step S14, the layed-up green bodies are calcined. In this way, the green body formation step S1 is completed. The woven fabric 1 which is at a calcined state in the temporary sintering step S14 is hereinafter referred to as a "green body". A density of the green body obtained in the green body formation step S1 is increased by carrying out the densification step S2.

The densification step S2 includes a second infiltration step S21 (infiltration step), a drying step S22, a steam treatment step S23, a first determination step S24, a sintering step S25, and a second determination step S26. In the densification step S2, the second infiltration step S21, the drying step S22, the steam treatment step S23, the first determination step S24, the sintering step S25, and the second determination step S26 are carried out in this order. In the densification step S2, some steps can be repeatedly carried out.

In the second infiltration step S21, the green body is further infiltrated with the polymer as the precursor of the matrix 3. In the green body before the second infiltration step S21 is carried out, the matrix 3 is disposed only in a part of a gap between the fiber bundles 2. In other words, at this stage, a density of the green body, that is, a filling rate of the matrix 3 is not sufficiently increased, and there is room for further forming the matrix 3. Therefore, by carrying out the second infiltration step S21, the layed-up green bodies are further infiltrated with the polymer as the precursor of the matrix 3. In the second infiltration step S21, an infiltrated green body is formed.

After the second infiltration step S21, the drying step S22 is carried out. The green body which has been further infiltrated with the polymer in the second infiltration step S21 contains a large amount of solvent and moisture of the slurry used for infiltration. In the drying step S22, the solvent is volatilized and the moisture is vaporized. As a result, a dried green body is formed. A volume of the dried green body becomes smaller than a volume of the infiltrated green body.

After the drying step S22, the steam treatment step S23 is carried out. In the steam treatment step S23, the dried green body is left under a saturation water vapor pressure. Specifically, the dried green body is hermetically sealed in a treatment container. A temperature in the treatment container is desirably 30° C. to 200° C. More desirably, the temperature in the treatment container is 80° C. to 150° C., and most desirably 100° C. to 130° C. A time during which the steam treatment step S23 is carried out is appropriately selected from several minutes to several hours, and a nominal value is about 1 hour.

Figure 4:
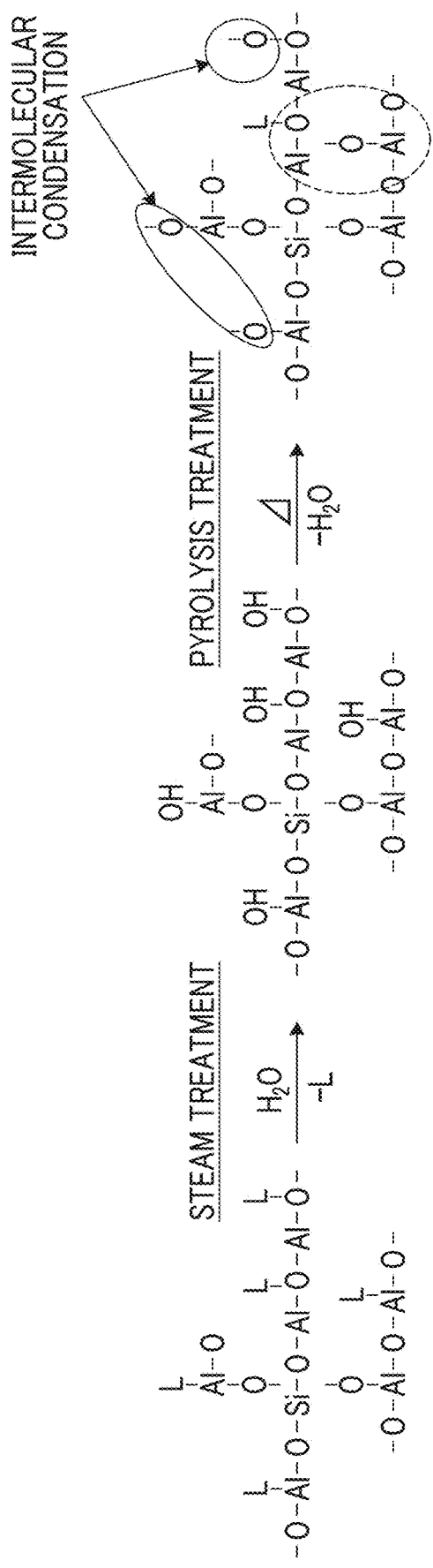
FIG. 4 is an explanatory diagram showing changes in composition of a matrix in a steam treatment step according to the first embodiment of the present invention.

In the steam treatment step S23, a part of the polymer (that is, the polymer as the precursor of the matrix 3) contained in the dried green body is hydrolyzed. Specifically, a chemical reaction as shown in FIG. 4 occurs in the polymer by carrying out the steam treatment step S23. In FIG. 4, "L" represents a predetermined leaving group. As shown in the same drawing, by carrying out the steam treatment step S23, the L group in the polymer is replaced with an OH group. By carrying out the steam treatment step S23, a treated green body is formed.

After the steam treatment step S23, the first determination step S24 is carried out. In the first determination step S24, it is determined whether or not the steam treatment is sufficiently progressing in the above-mentioned treated green body. In a case where it is determined that the steam treatment is sufficiently performed in the first determination step S24, the process proceeds to the subsequent sintering step S25. On the other hand, in a case where it is determined that the steam treatment is not sufficiently performed, the second infiltration step S21, the drying step S22, and the steam treatment step S23 are carried out again. That is, the second infiltration step S21, the drying step S22, and the steam treatment step S23 are repeated until it is determined that the steam treatment is sufficiently performed in the first determination step S24. In the present embodiment, determination is made in the first determination step S24. However, the number of repetitions of the second infiltration step S21, the drying step S22, and the steam treatment step S23 which allows sufficient steam treatment may be determined in advance by experiments or the like, and the determined number of times may be repeated.

In the sintering step S25, the treated green body is calcined. By carrying out the sintering step S25, a chemical reaction occurs between the woven fabric 1 and the polymer as the precursor as described above. Due to this chemical reaction, the polymer becomes the matrix 3 and becomes a state of being infiltration-chemically bonded to the fiber bundle 2 of the woven fabric 1.

Specifically, in the sintering step S25, as shown in FIG. 4, an OH group contained in the polymer becomes an oxo group (O group) by a dehydration reaction, and the polymer as a precursor becomes the matrix 3. Therefore, in the polymers after the sintering step S25, intermolecular condensation occurs between adjacent oxo groups. Furthermore, in the polymer, intramolecular condensation due to the oxo groups also occurs. As a result, three-dimensional networking of a matrix structure progresses and strength can be improved.

After the sintering step S25, the second determination step S26 is carried out. In the second determination step S26, it is determined whether or not the above-mentioned calcined green body is sufficiently densified. In the second determination step S26, in a case where it is determined that densification is sufficiently performed, it is determined that a CMC having desired characteristics is completed. On the other hand, in a case where it is determined that densification is not sufficiently performed, the second infiltration step S21, the drying step S22, the steam treatment step S23, and the sintering step S25 are carried out again. That is, the second infiltration step S21, the drying step S22, the steam treatment step S23, the first determination step S24, and the sintering step S25 are repeated until it is determined that densification is sufficiently performed in the second determination step S26. In the present embodiment, determination is made in the second determination step S26. However, the number of repetitions of the second infiltration step S21, the drying step S22, the steam treatment step S23, the first determination step S24, and the sintering step S25 which allows sufficient densification may be determined in advance by experiments or the like, and the determined number of times may be repeated. In this way, the entire steps of the manufacturing method for the ceramic matrix composite 100 are completed.

As described above, according to the manufacturing method of the ceramic matrix composite 100 according to the present embodiment, by carrying out the steam treatment step S23, it is possible to increase infiltration efficiency of the polymer with respect to the green body. That is, it is possible to obtain the ceramic matrix composite 100 having desired characteristics without carrying out the subsequent sintering step S25 many times. Therefore, it is possible to avoid decreased strength due to heat and prolonged manufacturing time, which are caused in a case where the sintering step S25 is repeated.

By carrying out the steam treatment step S23, adjacent oxo groups in the polymers undergo intermolecular condensation. Furthermore, in the polymer, intramolecular condensation due to the oxo groups also occurs. That is, the polymers form a three-dimensional network. As a result, strength of the matrix 3 after the sintering step S25 can be increased. In other words, by carrying out the steam treatment step S23, a CMC having a desired strength can be obtained at an early stage as compared with a case where, for example, only the sintering step S25 is repeated a plurality of times. Therefore, it is possible to decrease the number of times of the sintering step S25, and it is also possible to decrease a possibility that decreased strength or decreased weight occurs due to heat.

In addition, the steam treatment step S23 is carried out under a saturation water vapor at 30° C. to 200° C. Since treatment can be carried out at a relatively low temperature in this manner, infiltration efficiency of the polymer with respect to the green body can be increased without using a large-scale facility.

The first embodiment of the present invention has been described as above. Various modifications can be made to the above-described configuration and method without departing from the gist of the present invention.

For example, in the first embodiment, it is described that the second infiltration step S21, the drying step S22, and the steam treatment step S23 are repeatedly carried out. However, the steps may be carried out only once. Similarly, in the first embodiment, it is described that the second infiltration step S21, the drying step S22, the steam treatment step S23, the first determination step S24, and the sintering step S25 are repeatedly carried out. However, the steps may be carried out only once.

Second Embodiment

Figure 5:
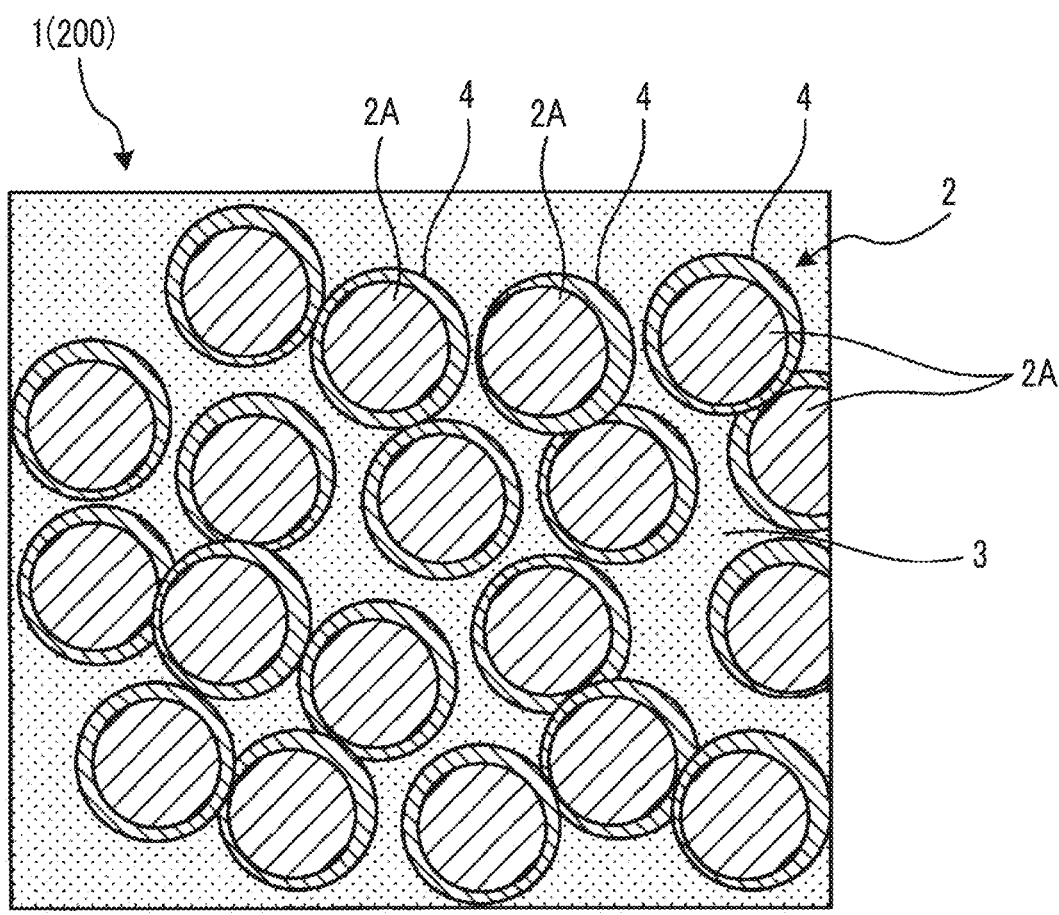
FIG. 5 is an enlarged schematic view showing a configuration of a ceramic matrix composite according to a second embodiment of the present invention.
Figure 6:
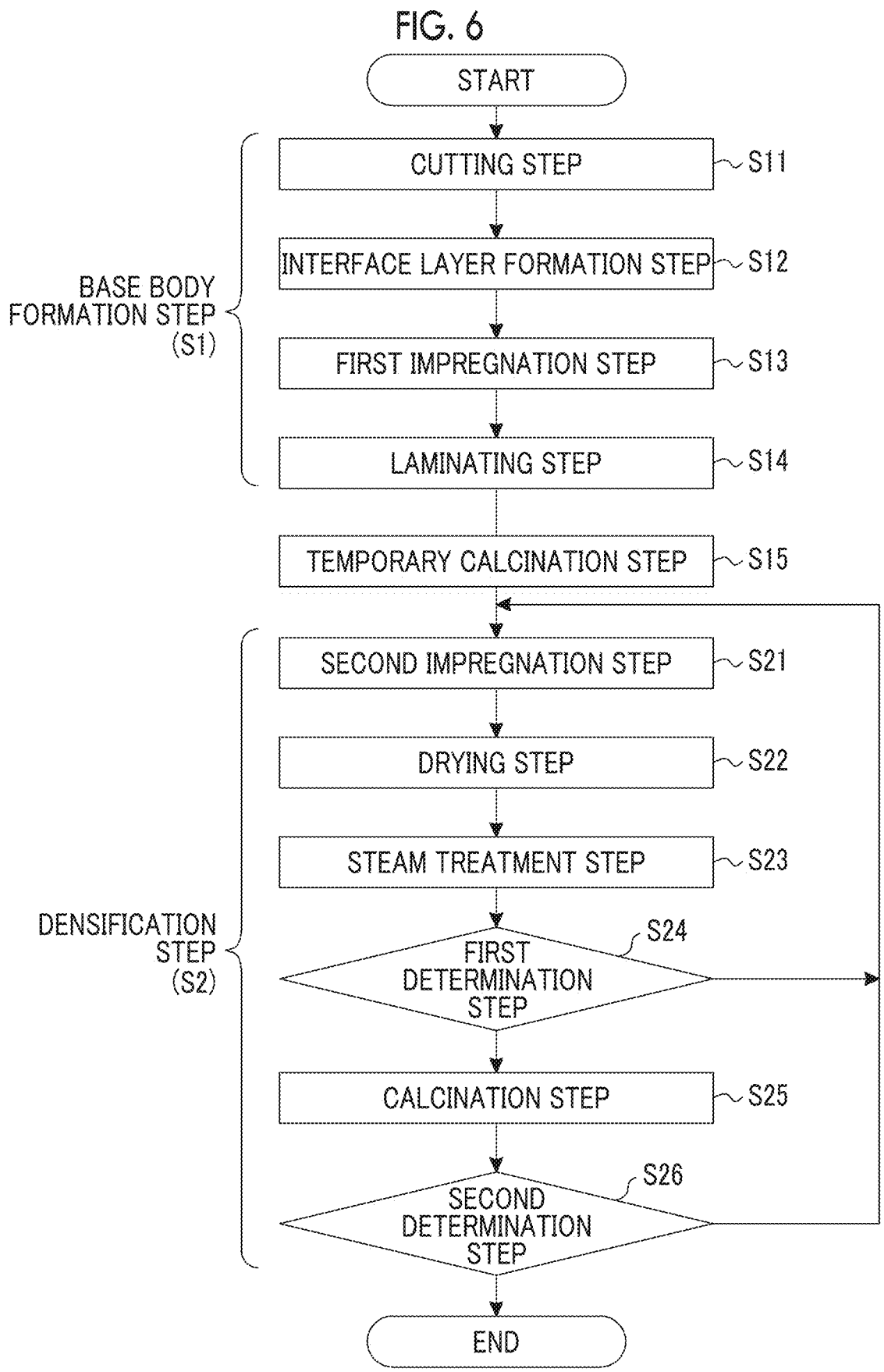
FIG. 6 is a process chart showing a manufacturing method for the ceramic matrix composite according to the second embodiment of the present invention.
Figure 7:
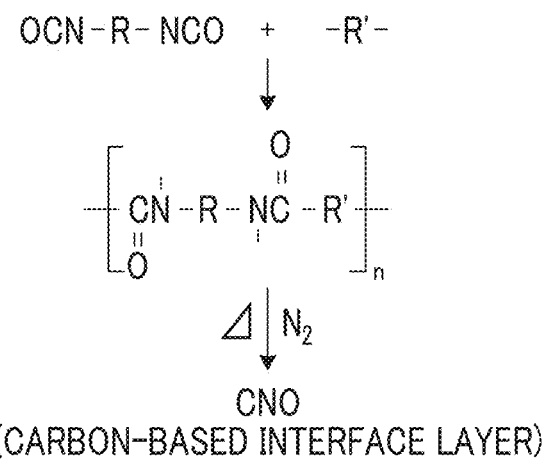
FIG. 7 is an explanatory diagram showing a process of synthesis and pyrolysis in a case where polyurethane is used as a sizing agent, in the second embodiment of the present invention.

Next, the second embodiment of the present invention will be described with reference to FIGS. 5 to 7. As shown in FIG. 5, the ceramic matrix composite 200 according to the present embodiment is different from the first embodiment in that an interface coating 4 is provided on peripheries of a fiber bundle 2 of the woven fabric 1, and fibers 2A. Specifically, the interface coating 4 has a carbon-based composition such as CNO. As will be described in detail later, in forming the interface coating 4, the woven fabric 1 is heated under a nitrogen atmosphere. As a result, a chemical reaction occurs in a polyurethane-based polymer as a sizing agent which has adhered, from the beginning, on the fiber bundle 2 and the fibers 2A. As a result, the carbon-based interface coating 4 as described above is obtained. By causing the interface coating 4 to be formed, a reaction between the fiber bundle 2 and the fibers 2A, and a matrix 3 is suppressed, and strength characteristics (for example, strength and toughness) of a CMC which is a final product can be further increased.

Next, a manufacturing method for the ceramic matrix composite 200 according to the present embodiment will be described. As shown in FIG. 6, the present embodiment is different from the first embodiment in that a green body formation step S1 further includes an interface coating formation step S12. Specifically, the interface coating formation step S12 is carried out after the cutting step S11 and before the first infiltration step S13.

In the interface coating formation step S12, a cut woven fabric 1 is heated under a nitrogen atmosphere. As a result, the sizing agent can be modified to form the carbon-based interface coating 4. Specifically, as shown in FIG. 7, in a case where polyurethane is used as the sizing agent, CNO as the interface coating 4 is generated through synthesis and pyrolysis of polyurethane.

As the sizing agent, it is possible to use at least one selected from the group consisting of polyurethane, epoxy resin, polybutadiene, polyalkylene glycol, polyolefin resin, vinyl ester resin, saturated polyester resin, unsaturated polyester resin, polyamide resin, polyimide resin, polyamideimide resin, acrylic resin, polypropylene resin, and pitch-based resin. In other words, as long as at least one chemical species in the above-mentioned group is possessed as the sizing agent, the interface coating 4 can be easily formed only by being heated under a nitrogen atmosphere.

In this manner, by carrying out the interface coating formation step S12, it is possible to form the interface coating 4 on a periphery of the fiber bundle 2 without removing the sizing agent. As a result, it is possible to form an interface in the interface coating formation step S12 without removing a material which has adhered as the sizing agent on a periphery of the fiber bundle 2 of the woven fabric 1 so as to form the interface. As a result, it is possible to obtain a CMC having the interface coating without making steps complicated and prolonged. In addition, since there is no need to separately prepare materials for forming the interface coating 4, cost reduction can be achieved.

The second embodiment of the present invention has been described as above. Various modifications can be made to the above-described configuration and method without departing from the gist of the present invention.

EXAMPLES

Figure 8:
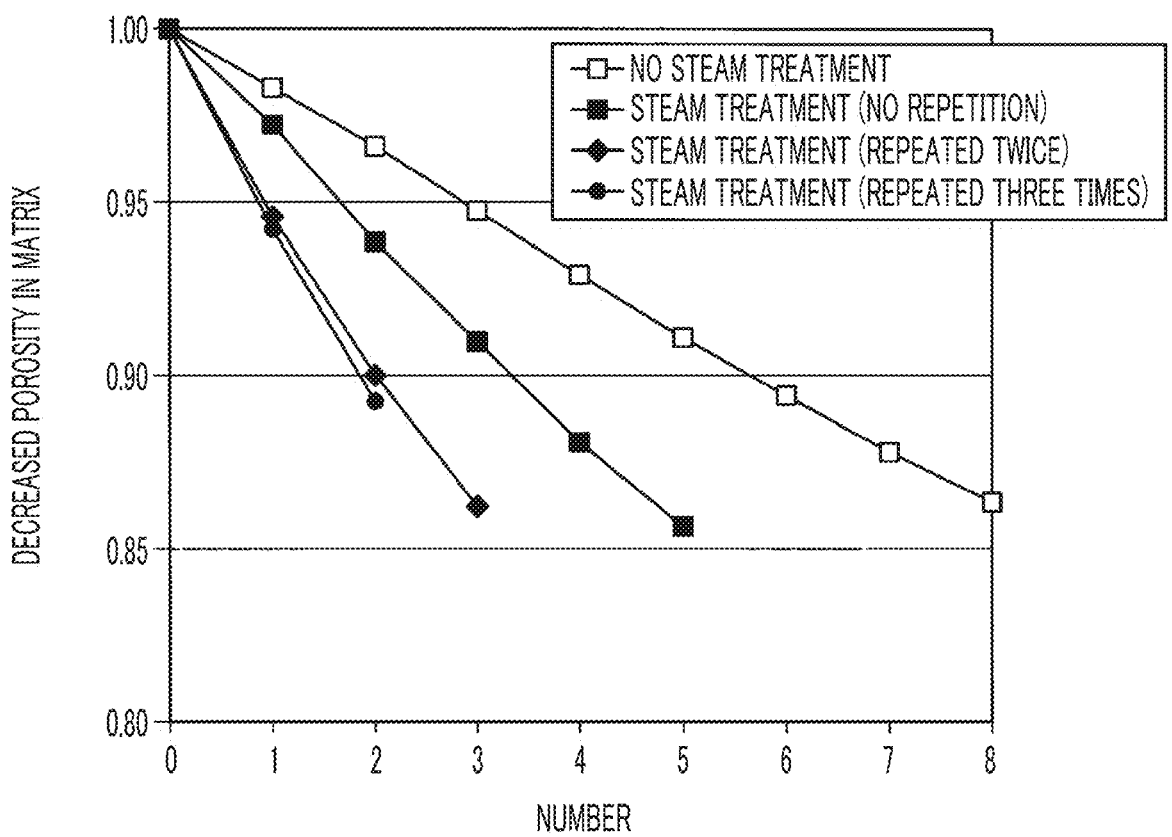
FIG. 8 is a graph showing a relationship between the number of steam treatment steps and porosity of a matrix in examples of the present invention.

Next, examples of the present invention will be described with reference to FIG. 8. FIG. 8 is a graph showing a relationship between presence or absence of the steam treatment step S23 described in the first embodiment and the number of repetitions of the densification step S2, and porosity of the matrix 3. A horizontal axis of the graph represents the number of repetitions of the sintering step S25. A vertical axis of the graph represents a value of porosity in a case where porosity of the initial matrix 3 is set as 1. That is, a lower value of porosity indicates that an infiltration rate of the matrix 3 is higher and densification is progressing. In addition, since low porosity can be achieved in a state where the number of repetitions of the sintering step S25 is kept low, the porosity is important for decreased strength in fibers, cost reduction, and shortened working period. That is, in the present embodiment, by repeatedly carrying out the steam treatment step S23, decreased number of sintering steps S25 and low porosity can be realized.

As shown as a comparative example in FIG. 8, in a case where the steam treatment step S23 was not carried out, it was necessary to repeat the densification step S2 eight times in order to decrease the porosity to about 0.85. On the other hand, in a case where the steam treatment was carried out once, desired porosity was reached only by repeating the densification step S2 five times. Furthermore, in a case where the steam treatment was carried out twice, the desired porosity was reached only by repeating the densification step S2 three times. In addition, in a case where the steam treatment was carried out three times, the desired porosity was reached only by repeating the densification step S2 twice.

In this manner, it has been shown that by carrying out the steam treatment step S23, it is possible to decrease the number of times of carrying out the densification step S2. Furthermore, it has been shown that as the number of times of carrying out the steam treatment step S23 is increased, the number of times of carrying out the densification step S2 is decreased.

REFERENCE SIGNS LIST

1: Woven fabric
2: Fiber bundle
2A: Fibers
3: Matrix
4: Interface coating
10: Fiber layer
100, 200: Ceramic matrix composite

The invention claimed is:

1. A manufacturing method for a ceramic matrix composite having a woven fabric that has a plurality of fiber bundles containing one of first components selected from alumina, mullite, and SiC and a matrix containing one of second components selected from alumina, mullite, and SiC and is disposed in a gap between the plurality of fiber bundles, the method comprising:
a green body formation step of forming a green body by infiltrating the woven fabric with a polymer blend including a polymer having —Al—O— linkage and a polymer having —Al—O—Si—O linkage as a precursor of the matrix and performing sintering; and
a densification step of further infiltrating the green body with the polymer blend and performing sintering,
wherein the densification step includes
an infiltration step of further infiltrating the green body with the polymer blend to form an infiltrated green body,
a drying step of drying the infiltrated green body to form a dried green body,
after the drying step, a steam treatment step of leaving the dried green body under a saturation water vapor pressure to increase infiltration of the polymer blend into the dried green body by intermolecular condensation of adjacent oxo groups in the polymer blend and intramolecular condensation of the oxo groups in the polymer blend to form a crosslink containing —Al—O—Al— linkages and a three-dimensional network, thereby, forming a treated green body,
a first determination step of determining whether or not the steam treatment is sufficiently progressing in the treated green body, and
a sintering step of sintering the treated green body,
after the steam treatment step, in response to the steam treatment being determined not sufficiently performed in the first determination step, the infiltration step, the drying step, and the steam treatment step are repeated, and in the sintering step, the treated green body for which the infiltration step, the drying step, and the steam treatment step have been repeated a plurality of times is calcined.

2. The manufacturing method for a ceramic matrix composite according to claim 1,
wherein the steam treatment step is carried out under saturation water vapor at 30° C. to 200° C.

3. The manufacturing method for a ceramic matrix composite according to claim 1,
wherein the woven fabric has a sizing agent that covers a periphery of the plurality of fiber bundles, and
the method further comprises an interface coating formation step of forming an interface coating on the plurality of fiber bundles by heating the woven fabric under a nitrogen atmosphere to modify the sizing agent, before the green body formation step.

4. The manufacturing method for a ceramic matrix composite according to claim 3,
wherein the sizing agent is at least one selected from the group consisting of polyurethane, epoxy resin, modified epoxy resin, phenol resin, polyimide resin, and polyamide resin.

* * * * *